US005622235A

United States Patent [19]

Merritt

[11] Patent Number: 5,622,235

[45] Date of Patent: Apr. 22, 1997

[54] TRACKED VEHICLE

[76] Inventor: John T. Merritt, 305 Foxhorn Dr., Waterford, Wis.

[21] Appl. No.: 447,822

[22] Filed: May 23, 1995

Related U.S. Application Data

[63] Continuation of Ser. No. 207,376, Mar. 7, 1994, Pat. No. 5,431,240, which is a continuation of Ser. No. 894,107, Jun. 5, 1992, abandoned.

[51] Int. Cl.[6] .......................... B62D 55/00; B62D 55/24; B66C 23/78

[52] U.S. Cl. .................... 180/9.42; 180/9.23; 280/763.1; 212/289; 212/304

[58] Field of Search .................................... 180/9.1, 9.23, 180/9.42; 280/763.1; 212/189, 164, 238, 261, 304, 289; 182/36–39, 2, 12, 13

[56] References Cited

U.S. PATENT DOCUMENTS

| | | | |
|---|---|---|---|
| 3,056,465 | 10/1962 | Gerrans | 182/148 |
| 3,227,295 | 1/1966 | Hamilton . | |
| 3,365,214 | 1/1968 | Garnett | 280/763.1 |
| 3,608,756 | 9/1971 | Guinot | 212/304 X |
| 3,713,544 | 1/1973 | Wallace et al. | 212/189 |
| 3,777,898 | 12/1973 | Gallay | 212/189 |
| 3,884,359 | 5/1975 | Suverkrop | 212/164 |
| 3,891,264 | 6/1975 | Hunter II et al. | 182/2 X |
| 3,985,036 | 10/1976 | Decker et al. | 212/189 X |
| 4,014,400 | 3/1977 | Cline et al. | 180/9.1 |
| 4,124,124 | 11/1978 | Rivet | 212/164 |
| 4,195,740 | 4/1980 | Beduhn et al. | 180/9.1 X |
| 4,273,214 | 6/1981 | Grove | 182/2 |
| 4,282,794 | 8/1981 | Miller, deceased et al. | 182/148 |
| 4,326,571 | 4/1982 | Crawford | 212/238 X |
| 4,359,137 | 11/1982 | Merz et al. | 182/2 |
| 4,640,377 | 2/1987 | Wossner | 180/9.1 |
| 4,823,852 | 4/1989 | Longford | 180/9.1 X |
| 4,969,789 | 11/1990 | Searle | 212/238 X |
| 4,979,588 | 12/1990 | Pike et al. | 182/2 X |
| 4,986,377 | 1/1991 | Moriarty | 180/9.1 X |
| 5,117,595 | 6/1992 | Brendel | 212/189 X |
| 5,268,591 | 12/1993 | Fujmoto | 182/2 |
| 5,310,217 | 5/1994 | Paskey et al. | 280/763.1 |

FOREIGN PATENT DOCUMENTS

| | | | |
|---|---|---|---|
| 0652535 | 2/1963 | Italy | 212/189 |
| 5178172 | 7/1993 | Japan | 280/763.1 |
| 1548665 | 7/1979 | United Kingdom | 180/9.1 |
| 2135273 | 8/1984 | United Kingdom | 212/189 |
| 2178724 | 2/1987 | United Kingdom | 212/304 |

*Primary Examiner*—Kevin Hurley
*Attorney, Agent, or Firm*—Jansson & Shupe, Ltd.

[57] ABSTRACT

The invention is a small, maneuverable, tracked vehicle capable of being equipped with a tool such as, but not limited to, buckets, diggers, tree spades, trenching devices, and augers. The vehicle is small and light enough to enter and be used in places, such as residential yards, in which traditional vehicles with buckets and digging tools, because of their size and weight, cannot be used or other places where flotation is a concern. The preferred vehicle has four outriggers to stabilize the vehicle during use, the outriggers arranged at an angle to a longitudinal axis of the vehicle.

3 Claims, 1 Drawing Sheet

TRACKED VEHICLE

This is a continuation of U.S. Pat. No. 5,431,240 having an application Ser. No. 207,376 filed on Mar. 7, 1994, which is a continuation of application Ser. No. 894,107, filed Jun. 5, 1992 now abandoned.

BACKGROUND OF THE INVENTION

1. Field of the Invention

The present invention relates generally to tracked vehicles and light industrial equipment.

2. Description of the Related Art

Self-propelled industrial vehicles with buckets or digging tools are well known, and typically include a wheeled platform for mobility, a mot or, and a boom. Some of the vehicles comprising the art to which the invention relates include a tool such as, but not limited to, a bucket, digger, tree spade, trenching device, or an auger as a replaceable attachment (hereinafter collectively and individually "tool(s)").

All of such vehicles comprising the an to which the invention relates are typically quite large and heavy, and thus have limited uses. For example, a large, heavy, vehicle of the aforementioned type is not particularly useful in closely confined areas where the ground on which the vehicle rests is not particularly dense. In such instances such vehicles have been known to sink into the ground and severely damage the terrain or landscaping.

A typical example of a location inaccessible to a large or heavy vehicle found in the art to which the invention relates is a residential back yard. Accordingly, the work which could ordinarily be performed by large and heavy vehicles must be performed in another way, e.g., by having persons climb trees to trim limbs; or climb utility poles to service the utility wiring attached thereto.

Therefore, some of the more common problems associated with vehicles comprising the art to which the invention relates includes, but are not limited to: lack of mobility in confined spaces, diminished utility where ground surfaces are such that they will not support the weight of the vehicle; the damage to lawns and landscaped terrain as a result of maneuvering such vehicles; transportability of such vehicles from location to location; cost of such vehicles; the materials used in the construction of such vehicles which makes them electrically conductive and possibly unsafe when in use around electrical lines and the like.

The following patents identified by number and inventor, all of which are incorporated by reference as if fully set forth herein, are directed to various devices comprising the art to which the invention relates:

| | Inventor |
|---|---|
| U.S. Pat. No. | |
| 3,056,465 | Gerrans |
| 3,227,295 | Hamilton et al. |
| 3,365,214 | Garnett |
| 3,777,898 | Gallay |
| 3,884,359 | Suverkrop |
| 3,713,544 | Wallace |
| 3,891,264 | Hunter, II et al. |
| 3,985,036 | Decker et al. |
| 4,014,400 | Cline et al. |
| 4,823,852 | Lingford |
| 4,124,124 | Rivet |
| 4,195,740 | Beduhn et al. |
| 4,273,214 | Grove |
| 4,282,794 | Miller et al. |
| 4,326,571 | Crawford |
| 4,640,377 | Wossner |
| 4,969,789 | Searle |
| 4,986,377 | Moriarity |
| 5,117,595 | Brendel |
| UK Patent Application No. | |
| 2,135,273 A | Moussu |
| 2,178,724 A | Wadsworth |
| 2,224,482 A | Williams |
| UK Patent Number | |
| 1,548,665 | Bunting et al. |
| Italian Patent Number | |
| 652,535 | unknown |

SUMMARY OF THE INVENTION

The present invention is a small, maneuverable, self-propelled vehicle with a tracked platform and a tool (defined above). The tracks of the vehicle are preferably made of rubber or an elastomeric material, to provide a measure of electrical insulation between the vehicle and the ground on which it sits.

The vehicle also has an outrigger system which preferably comprises four pivotal and extendable outriggers attached to the platform to stabilize the vehicle. Adjacent outriggers are arranged substantially perpendicular to each other and spaced apart at approximately ninety degrees from one another, and forty-five degrees from a longitudinal axis of the vehicle.

The preferred configuration of the outriggers include a hydraulic cylinder, an outrigger leg and a foot attached to the leg. The outrigger leg and hydraulic cylinder are pivotally attached to the platform via a brace enabling the outriggers to be raised and lowered to place the feet into a ground engaging contact. The outriggers therefore increase the area of ground contact to stabilize the vehicle when the boom is extended or otherwise used.

The feet are preferably fitted with rubber shoes. In combination with the preferred rubber or elastomeric track, they too provide insulation from electrical ground contact. When not in use, the outriggers are retracted and rest in a generally upright vertical orientation with the platform.

The platform is preferably formed of a high strength, lightweight material such as steel or metal alloys, aluminum, or possibly even synthetic materials. The platform typically forms the base onto which is attached a plurality of conventional strength enhancing structures such as, I-beams and riser stiffeners. The platform may also comprise a boom support which supports the boom in a horizontal position when, for example, it is not in use.

The preferred embodiment of the boom component is formed of high strength fiberglass or other non-conductive material. The boom has a first main section and a second extendable section. The first section can be elevated from a substantially horizontal position to a working position.

The second section of the boom is fitted with a bucket or tool. The boom is preferably mounted to a pivoting support or turret. The turret has a vertical portion and an angled portion. The angled portion acts as a counter weight and thus is angled in the direction away from the working or tool end of the boom. The turret enables rotation of the boom through 360 degrees of rotation.

In use, the operator sits at the operator station and manipulates control levers which engage and disengage the motor. A drive means is used to engage the tracks to propel the vehicle. In addition, a hydraulic pump means actuates the hydraulic cylinders of the system depending upon the cylinders selected by the operator. Although the present invention may use any of a variety of tools, the embodiment described herein has a bucket in which workers may be elevated.

It will be understood that the embodiment described hereinbelow is only one of many embodiments of the invention. It is possible to make modifications without departing from the scope or spirit of the invention as claimed.

Accordingly, there are a variety of ways in which the invention may be summarized, only one of which is the following: a compact self-propelled vehicle having a longitudinal axis, said vehicle comprising: a platform having track means for propelling the platform; and a pair of spaced-apart tracks operably attached to the platform. The vehicle also has a plurality of spaced-apart outriggers, each attached to a separate corner of the platform and mounted for movement between a ground-engaging position and a retracted position. Each outrigger includes a pivot means for pivotally attaching each outrigger independently to the platform and means for independently positioning each outrigger. The vehicle also has a turret rotatably mounted to the platform, a boom extending from the turret and a tool operatively attached to the boom. Such tool exhibits 360 degrees of movement with respect to the platform. An engine is mounted with respect to the platform for powering the tracks and there is an engine-driven hydraulic pump for powering the tool, the outriggers, and the tracks. The boom extends away from the turret in a first direction and the turret includes a substantially vertical portion and an angled portion extending away from the boom in a second direction opposite the first direction.

In a preferred embodiment of the invention, the vehicle has four corners and an outrigger extends angularly from each corner. In a highly preferred embodiment, the tool further comprises a tool selected from the group of tools including a bucket, digger, tree spade, trenching device, and auger.

It is an object of the present invention to provide a lightweight, compact tracked vehicle maneuverable in a confined space.

It is an object of the present invention to provide a tracked vehicle of the aforementioned type with ground engaging outriggers.

It is an object of the present invention to provide a tracked vehicle of the aforementioned type that is capable of operating with a group of tools including a bucket, digger, tree spade, trenching device, and auger.

Another object of the invention is to provide a tracked vehicle having a boom, the weight of which is counterbalanced, at least to some degree.

These and other objects, advantages and features of the invention shall become apparent after consideration of the specification, including the drawings, and the appended claims. Accordingly, the objects, advantages and features set forth herein are merely representative of those associated with the invention and are not intended to be limiting or an exhaustive list thereof.

DETAILED DESCRIPTION OF THE PREFERRED EMBODIMENT(S)

Figure 1:
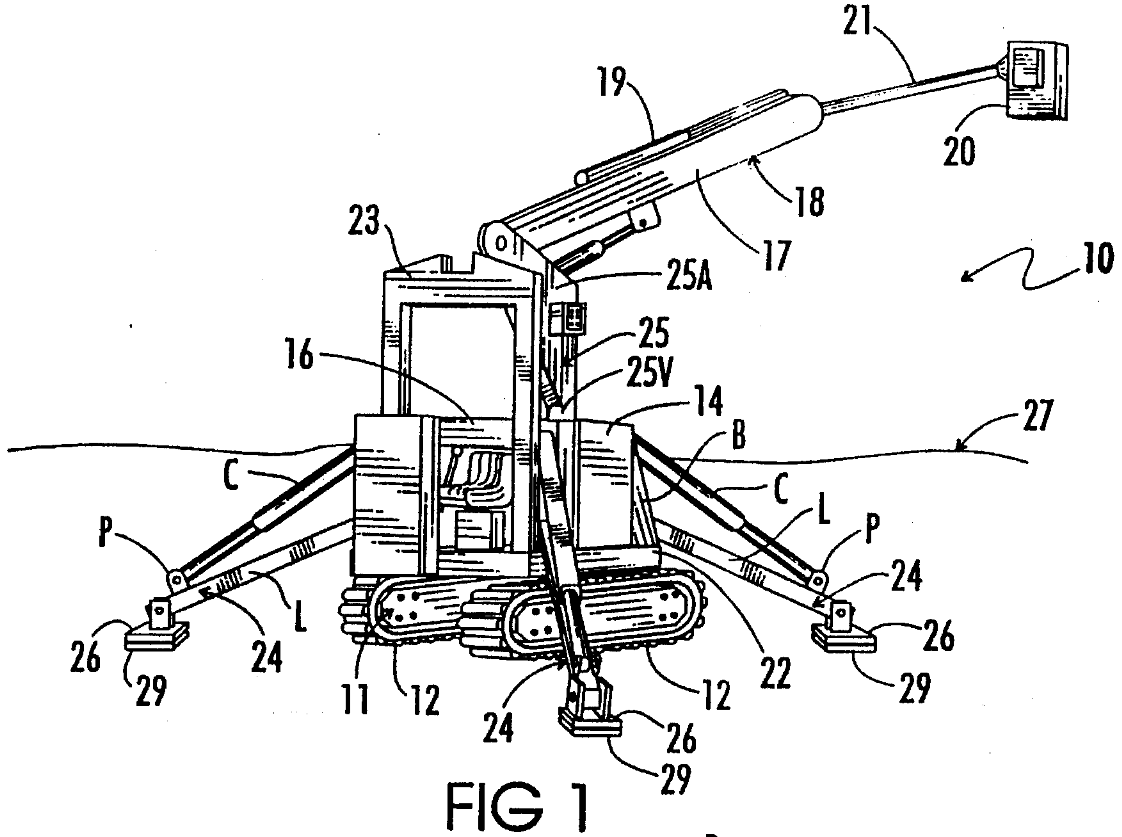
FIG. 1 is an elevated perspective view of an embodiment of the invention shown with the boom extended and outriggers in ground engaging contact.
Figure 2:
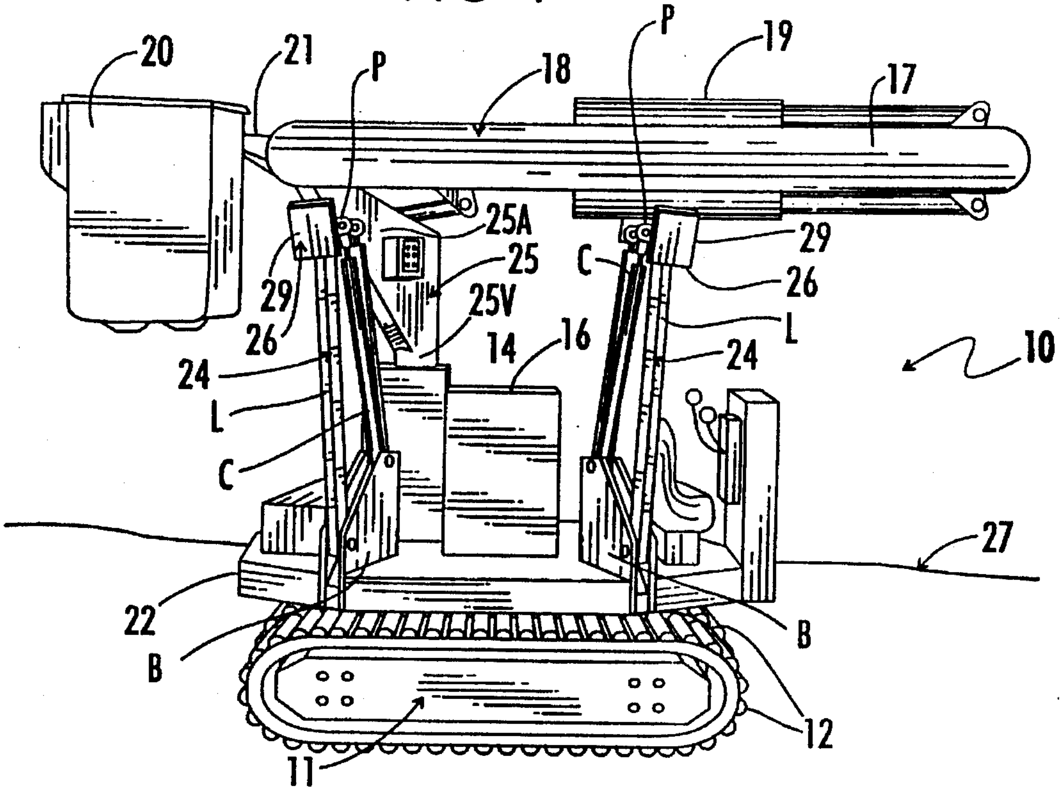
FIG. 2 is an elevated perspective view of the embodiment shown in FIG. 1 with the boom contracted and outriggers in their substantially vertical folded positions.

Referring now with particularity to the figures, it can be seen that an embodiment of the present inventive tracked vehicle is designated generally by reference numeral 10. The vehicle 10 has a track means 11, comprising two spaced apart rubber or elastomeric tracks 12. The tracks may also be made from any other suitable electrical energy insulating material. The boom and outriggers are powered by a hydraulic pump means, designated generally by the reference numeral 14. The engine 16 may be a diesel engine, for example, and is used to power the pump 14. Such pump 14 may be any suitable three-stage pump.

The vehicle is equipped with a hydraulically operated boom, designated generally by the reference numeral 18, which raises and positions the tool or bucket 20. The boom 18 is preferably formed with a lightweight, high strength, electrically non-conductive material such as fiberglass to provide an insulated barrier between electrical energy sources and the operator should the boom contact such a source. In addition, the preferred fiberglass boom 18 enables the vehicle 10 to be more stable and resistant to tipping as will be described below.

Boom 18 is comprised of a first section 17, having a hydraulic boom cylinder 19 parallel to the first section 17. First section 17 receives an extendable section 21 which is actuated from a retracted to an extendable position by the hydraulic cylinder 19.

The boom 18 can be lifted through an angle from a plane parallel to the ground, and can be extended to further lift the bucket 20 and extend it away from the vehicle 10. Optional boom support 23 receives the boom 18 when not in use or used in the supported the rest position. Further, the boom 18 can be rotated 360 degrees about the point of attachment on the platform 22 by a pivot or turret 25. The turret 25 is comprised of a substantially vertical portion 25 V and an angled portion 25A. The angled portion 25A serves many purposes including acting as a counterbalance for the boom 18.

The ability to pivot the boom 18 in this manner allows the operator of the vehicle 10 to reach more positions with the bucket 20 (or tool not shown) than with a traditional vehicle whose boom cannot be rotated through 360 degrees, or extended in the manner described. In addition, the second section 21 of the boom 18 is allowed to articulate with respect to the first boom section 17, enabling the operator to contact the ground, designated generally by the reference numeral 27, with the bucket 20 (or tool not shown).

The ability to pivot, articulate, and rotate the boom 18 through 360 degrees and to extend the second section 21 of the boom 18 so the bucket 20 reaches far from the vehicle 10 are dependent upon the four outriggers 24. Thus the outriggers 24 are positioned about the vehicle preferably in such a manner as to allow for maximum stability of the vehicle 10. Accordingly, their preferred placement is 90 degrees separation from one another.

Because the vehicle 10 is relatively small, and short in length and width as compared to other vehicles, albeit of a different type or configuration, the vehicle benefits from a small platform. The outriggers therefore enable the boom 18 and tool 20 to be extended far from the platform. Absent the outriggers 24, such extension would tend to cause the vehicle 10 to tip or topple over. Thus, the outriggers are provided to prevent or minimize the possibility of such an occurrence.

Simply stated, an outrigger 24 is placed approximately at each corner of the vehicle 10. Each outrigger is comprised of a leg component L, and hydraulic cylinder component C. Each outrigger leg and hydraulic cylinder are preferably pivotally attached to one another at pivot P, and are pivotally attached to the platform 22 by an outrigger brace B.

Each outrigger 24 extends in a direction which is at an angle of approximately 45 degrees to the longitudinal axis of the vehicle, and as mentioned about 90 degrees spaced apart from one another. When the outrigger(s) 24 is/are extended, the foot 26, having a shoe 29, is placed on the ground far outside of the base of the vehicle 10.

For example, the foot 26 of the front right outrigger 24 is both far in front and far to the right of the base or platform 22 of the vehicle 10. Similarly, the front left outrigger 24 is both far out front and far to the left of the platform 22. Together, the four outriggers 24 form a generally rectangular area much larger than the platform 22 of the vehicle 10. This preferred orientation provides a much more stable base for the vehicle 10 when used.

The embodiment of the invention disclosed herein is but one embodiment of the invention, and modifications and variations can be made without departing from the spirit or scope of the invention as claimed.

What is claimed is:

1. A compact industrial vehicle having a longitudinal axis, the vehicle comprising:

(a) a platform having tracks for propelling the platform;

(b) a turret attached to the platform;

(c) a boom extending from the turret;

(d) a tool rotatably attached to the boom for permitting 360 degrees of movement of the tool with respect to the platform;

(e) at least one stabilizing outrigger pivotally attached to the platform and operable between a rest position and an operable ground-engaging position; and (f) an engine mounted with respect to the platform for supplying power to the tool, the outrigger, and the track, and wherein:

the boom extends away from the turret in a first direction; and the turret includes a substantially vertical portion and an angled portion at the top of the turret and extending away from the boom in a second direction opposite the first direction, whereby at least a portion of the weight of the boom is counterbalanced.

2. The vehicle of claim 1, wherein the vehicle has four corners and an outrigger extends angularly from each corner.

3. The vehicle of claim 1 such that the tool further comprises:

a tool selected from the group of tools including a bucket, digger, tree spade, trenching device, and auger.

* * * * *